March 13, 1973 H. REINSCH ET AL 3,720,461
MOTION PICTURE PROJECTOR
Filed Feb. 17, 1970 3 Sheets-Sheet 1

INVENTORS
Herbert REINSCH
Peter KÖRNER

BY Michael I. Stuhl their ATTORNEY

INVENTORS:
Herbert REINSCH
Peter KÖRNER their ATTORNEY

INVENTORS
Herbert REINSCH
Peter KORNER their ATTORNEY

United States Patent Office 3,720,461
Patented Mar. 13, 1973

3,720,461
MOTION PICTURE PROJECTOR
Herbert Reinsch, Koengen, and Peter Korner, Reichenbach, Germany, assignors to Robert Bosch Photokino G.m.b.H., Stuttgart, Germany
Filed Feb. 17, 1970, Ser. No. 12,075
Claims priority, application Germany, Feb. 27, 1969,
P 19 09 790.6
Int. Cl. G03b 1/50
U.S. Cl. 352—224                                     7 Claims

ABSTRACT OF THE DISCLOSURE

The gate of a motion picture projector comprises a fixed guide and a movable guide with two pads which are biased toward the fixed guide by one leg of a hairpin spring so that each guide engages one marginal portion of the film during projection of images onto a screen. A system of links and levers is employed to disengage the spring from the movable guide so that the latter retains its position when the pressure plate is moved away from the film prior to rewinding. A mask is moved into registry with the window of the gate when the spring is disengaged from the movable guide.

BACKGROUND OF THE INVENTION

The present invention relates to cinematographic apparatus in general, and more particularly to improvements in motion picture projectors. Still more particularly, the invention relates to improvements in the mechanism which guides the film during travel through the projection gate.

It is already known to construct a motion picture projector in such a way that the film can be rewound on the supply reel without necessitating complete removal from the channel in which the film travels past the window of the projection gate. Reference may be had to Patents Nos. 3,240,550 and 3,460,889. Such projectors are provided with sensing means which detect a change in tension of film when the entire film is collected by the takeup reel and which effect movement of the pressure plate away from that portion of film which is located in the channel of the projection gate. Furthermore, such sensing means effect disengagement of film from the pull-down as well as from the spring-biased guide which bears against one marginal portion of film at one side of the channel. The guide is thereupon free to yield to spring bias and is moved into the channel so that it interferes with return movement of the film when the pressure plate returns to operative position. In other words, the width of the channel is reduced so that, when the pressure plate returns the film into the thus narrowed channel, a portion of film overlies the spring-biased guide and is clamped by the pressure plate. The film is unable to assume an optimum position for reengagement with the claw of the pull-down so that the latter cannot move the film; this results in overheating and charring of that portion of film which is exposed to heat generated by the projection lamp.

German Patent No. 849,215 discloses a modified motion picture projector wherein the movable guide is shifted away from the film in response to opening of the pressure plate. Such movement is carried out against the opposition of the spring which urges the movable guide toward the film, i.e., in a direction to reduce the width of the film channel. A drawback of such proposal is that the mechanism which shifts the movable film guide is rather bulky and comprises a large number of complicated and expensive parts.

SUMMARY OF THE INVENTION

An object of the invention is to provide a cinematographic apparatus, particularly a motion picture projector, wherein the movable guide which defines a portion of the channel for motion picture film travelling past the window of the projection gate need not be moved away from the film when the apparatus is set to collect the film on the supply reel.

Another object of the invention is to provide a projector wherein the movable film guide cannot reduce the width of the film channel when the pressure plate is moved to inoperative position preparatory to rewinding of film onto the supply reel.

A further object of the invention is to provide a projector wherein the passage of light through the window of the projection gate is terminated in automatic response to opening of the pressure plate.

An additional object of the invention is to provide a novel and improved gate for use in cinematographic apparatus wherein the film is automatically returned to an optimum position for reengagement with the pull-down when the pressure plate is returned to operative position.

Still another object of the invention is to provide a motion picture projector wherein the overheating of film in the gate on return movement of pressure plate to operative position is prevented in a novel and inexpensive way.

An ancillary object of the invention is to provide novel and improved means for biasing the movable guide toward the fixed guide of a projection gate.

The invention is embodied in a cinematographic apparatus, particularly in a motion picture projector, which comprises a gate including first and second guide means which define a channel for motion picture film and one of which is movable toward and away from the other guide means so that each thereof can engage one marginal portion of film in the channel when the one guide means is moved toward the other guide means, resilient means preferably including a hairpin spring which is arranged to bias the one guide means toward the other guide means so that each guide means then engages and guides the respective marginal portion of motion picture film in the channel, and actuating means operable to terminate the bias of the resilient means upon the one guide means.

Thus, instead of necessitating movement of the one guide means away from the other guide means against the opposition of resilient means, the improved apparatus is provided with means which simply terminates the bias of resilient means upon the one guide means so that the latter can remain in an optimum position for reengagement with the corresponding marginal portion of film when the film is returned into the channel in response to movement of the customary pressure plate to its operative position.

The novel features which are considered as characteristic of the invention are set forth in particular in the appended claims. The improved cinematographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
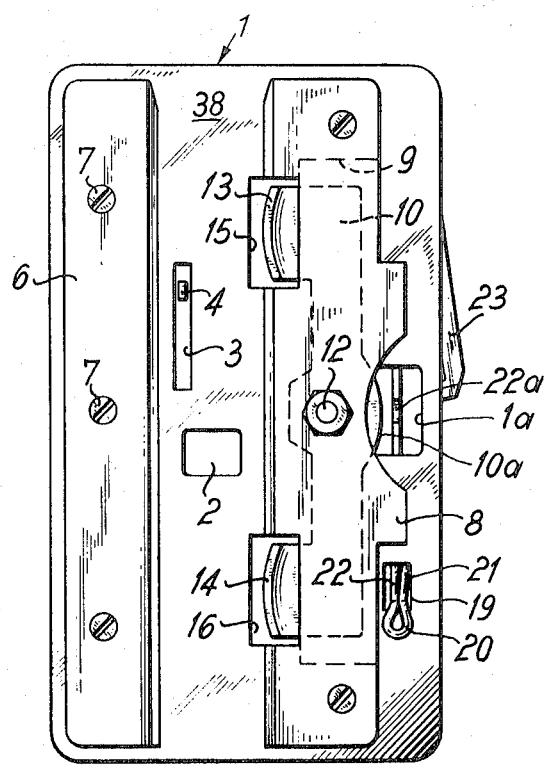
FIG. 1 is a front elevational view of a film gate structure in a motion picture projector which embodies the invention.
Figure 2:
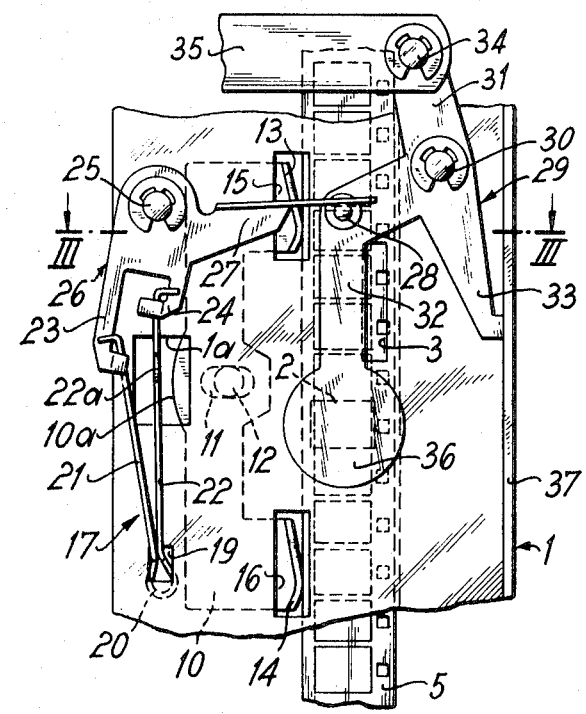
FIG. 2 is a rear elevational view of the film gate structure, with the resilient means in inoperative position.
Figure 3:
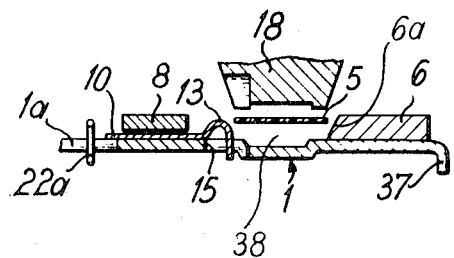
FIG. 3 is a sectional view as seen in the direction of arrows from the line III—III of FIG. 2.

Referring first to FIGS. 1 to 3, the numeral 1 denotes a plate-like support which is mounted in the housing of a motion picture projector behind the projection objective. The plate 1 is formed with a rectangular window 2 and forms part of a projection gate through which the motion picture film 5 passes during projection of images. An elongated slot 3 is provided laterally of and at a level above the window 2 to permit passage of the claw of a pull-down 4 which transports the film 5 stepwise in the longitudinal direction of the slot 3. A fixed film guide here shown as a rail 6 is secured to the front side of the plate 1 by screws 7 or like fasteners and its left-hand edge face 6a (as viewed in FIG. 3) serves to guide one marginal portion of the film 5 when the projector is in use to project images. A bearing member 8 is mounted on the front side of the plate 1 at the opposite side of the film channel 38 and the distance between the rail 6 and member 8 exceeds somewhat the width of the film 5, i.e., the member 8 does not contact the adjacent marginal portion of the film.

That surface of the bearing member 8 which is adjacent to the front side of the plate 1 is provided with a shallow depression 9 for a two-armed movable film guide 10 having an elongated transversely extending slot 11 for a guide pin 12 of the plate 1 (FIG. 2). The ends of the movable guide 10 are provided with film-engaging shoes or pads 13, 14 whose configuration is best shown in FIGS. 1 and 3. The foremost portions of the pads 13, 14 are curved rearwardly and extend into cutouts 15, 16 of the plate 1. A resilient element here shown as a hairpin spring 17 having two legs 21, 22 serves as a means for biasing the movable guide 10 toward the fixed guide rail 6 to maintain the pads 13, 14 in engagement with the adjacent marginal portion of the film 5 when the projector is in use, i.e., when the images are projected onto a screen while the film travels from a supply reel toward a takeup reel. The longer leg 22 of the spring 17 can bear against a convex projection or boss 10a of the movable guide 10 (see FIG. 4). The transverse slot 11 enables the guide 10 to yield in response to the bias of the spring 17 and to maintain its pads 13, 14 in engagement with the film 5 whereby the latter contacts the edge face 6a of the fixed guide rail 6.

The apparatus further includes a customary spring-biased pressure plate 18 (see particularly FIG. 3) which can be moved toward and away from the plate 1 in the region of the channel 38 between the rail 6 and movable guide 10 to thereby insure that the film frame registering with the window 2 is held against flexing. FIG. 3 shows the pressure plate 18 in retracted or open position in which the film 5 can be rewound onto the supply reel. The operative position of the pressure plate 18 is illustrated in FIG. 5; it will be noted that the plate 18 then holds the film 5 against the adjacent front surface of the plate 1 and that the pressure plate 18 has suitable cutouts for the end portions of the pads 13, 14.

The spring 17 is formed with a loop end portion or eye 20 which extends in part through an opening 19 of the plate 1. In this way, the spring 17 is coupled to the plate 1. The legs 21, 22 of the spring 17 have bent-over tips which engage with suitably configurated teeth on the arms 23, 24 of a displacing lever 26 which is fulcrumed on the plate 1, as at 25, and includes a third arm 27. The displacing lever 26 is mounted at the rear side of the plate 1, i.e., opposite the film channel 38 between the rail 6 and movable guide 10 The longer leg 22 of the spring 17 has an arched median portion 22a (see particularly FIG. 3) which extends forwardly through an opening 1a of the plate 1 and can be moved against the forementioned boss 10a on the movable guide 10.

Figure 4:
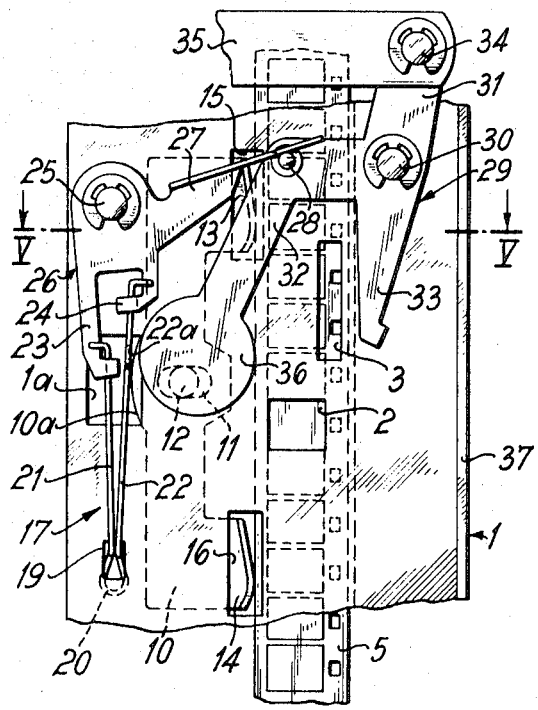
FIG. 4 illustrates the structure of FIG. 2 but with the resilient means in operative position.
Figure 5:
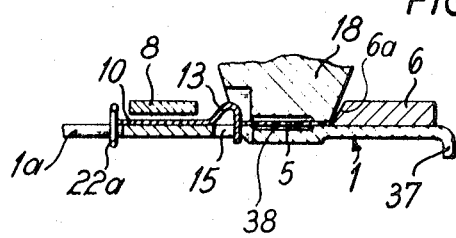
FIG. 5 is a sectional view as seen in the direction of arrows from the line V—V of FIG. 4.

In order to insure that the movable guide 10 remains in the position shown in FIG. 5 when the pressure plate 18 is withdrawn to the retracted position of FIG. 3, the apparatus comprises actuating means for reducing (including terminating) the bias of the spring 17 upon the boss 10a. In the absence of such actuating means, the longer leg 22 of the spring 17 would continue to bias the pads 13, 14 beyond the positions shown in FIG. 3 so that these pads would interfere with return movement of film 5 to the position of FIG. 5 (abutment with the front side of the plate 1). The bias of the spring 17 upon the boss 10a of the movable guide 10 is terminated by pivoting the displacing lever 26 from the position shown in FIG. 4 to that shown in FIG. 2. The fact that the edge face 6a of the guide rail 6 slopes toward the plate 1 and that the pads 13, 14 are curved in a manner as shown in FIGS. 3 and 5 is of advantage because the pressure plate 18 can readily return the film 5 to the position shown in FIG. 5. The displacing lever 26 thereupon causes the spring 17 to again urge the pads 13, 14 against the adjacent marginal portion of the film 5.

As clearly shown in FIGS. 2 and 4, the leg 21 of the spring 17 is shorter than the leg 22. Therefore, the shorter leg 21 can bias the longer arm 23 of the displacing lever 26 with a force which exceeds the force which the longer leg 22 can transmit to the arm 24. Consequently, the displacing lever 26 and the legs 21, 22 of the spring 17 tend to assume and remain in the positions shown in FIG. 2 in which the longer leg 22 is out of engagement with the movable guide 10, i.e., in which the arched median portion 22a of the leg 22 is away from the boss 10a.

The arm 27 of the displacing lever 26 is biased against a post or stud 28 on a second or intermediate lever 29 under the action of the shorter leg 21. The intermediate lever 29 is mounted at the rear side of the plate 1 for pivotal movement on a pin 30 and has three arms 31, 32, 33. The arm 31 is coupled to a motion transmitting link 35 by way of a pin 34. The link 35 can be moved by hand to thereby effect movements of the lever 26 between the positions shown in FIGS. 2 and 4. The arm 32 is provided with an opaque masking means 36 (hereinafter called mask) which overlies the window 2 behind the plate 1 when the spring 17 is disengaged from the movable guide 10 to thus prevent light issuing from the projection lamp from reaching the screen and to prevent heating of film during rewinding onto the supply reel. The arm 33 of the intermediate lever 29 abuts against a bead or ledge 37 of the plate 1 when the mask 36 overlies the window 2. Thus, the parts 33, 37 constitute a means for properly locating the mask 36 in registry with the window 2. The parts 26, 29, 35 together constitute the aforementioned actuating means for terminating the bias of spring 17 upon the movable film guide 10. The link 35 is the input member of the actuating means, the lever 26 is the displacing means, and the lever 29 is an intermediate member which links the input member 35 with the displacing means 26 and carries the mask 36.

The operation:

During projection of images, the parts of the apparatus assume the positions shown in FIGS. 4 and 5. The channel 38 for the film 5 is closed, i.e., the pressure plate 18 urges the film 5 against the front side of the plate 1. The mask 36 of the intermediate lever 29 is held out of the path of projection light so that such light can pass through the window 2 and through successive film frames to produce images on the screen. When the link 35 moves the intermediate lever 29 from the position of FIG. 2 to that shown in FIG. 4, the displacing lever 26 is pivoted in a counterclockwise direction to move the legs 21, 22 of the spring 17 in a direction to the right, as viewed in FIG. 2, whereby the median portion 22a of the leg 22 bears against the boss 10a and urges the pads 13, 14 of the movable guide 10 against the adjoining marginal portion of the film 5.

If the projection of images is to be interrupted, for example, to rewind a portion of or the entire film 5 onto the supply reel, the operator moves the link 35 so as to return the arm 33 of the intermediate lever 29 into abutment with the ledge 37 of the plate 1. The means for moving the link 35 (or a separate mechanism, not shown) simultaneously moves the pressure plate 18 to the retracted position of FIG. 3 and moves the film 5 away from the front side of the plate 1 so that the film is disengaged from the pull-down 4. When the arm 33 of the intermediate lever 29 reaches the ledge 37, the mask 36 on the arm 32 assumes the position shown in FIG. 2 and overlies the window 2 so that the screen is not illuminated at all and the mask shields the film against overheating. The shorter leg 21 of the spring 17 maintains the arm 27 of the displacing lever 26 in abutment with the post 28 on the intermediate lever 29 so that the lever 26 pivots in a clockwise direction and returns to the position of FIG. 2 in which the arm 24 holds the median portion 22a of the longer leg 22 away from the boss 10a of the movable guide 10. Thus, the guide 10 is not biased toward the fixed guide rail 6 and does not change its position, i.e., the pads 13, 14 remain in the positions shown in FIG. 5 (same as shown in FIG. 3). The sequence of the just described steps is selected in such a way that the spring 17 is disengaged from the movable guide 10 before the pressure plate 18 returns to the retracted position of FIG. 3 and before the film 5 is moved away from the front side of the plate 1.

If the user thereupon wishes to resume the projection of images, the link 35 is actuated again to pivot the intermediate lever 29 back to the position of FIG. 4 so that the displacing lever 26 also assumes the position shown in FIG. 4 and the longer leg 22 of the spring 17 bears against the boss 10a. A suitable detent structure (not shown) can be provided to normally hold the link 35 in the position shown in FIG. 4. Movement of the link 35 from the position of FIG. 2 to that shown in FIG. 4 is accompanied by movement of the pressure plate 18 back to operative position of FIG. 5 whereby the plate 18 urges the film 5 against the front side of the plate 1 in the channel 38 between the edge face 6a of the fixed guide rail 6 and the pads 13, 14 of the guide 10. As stated before, the position of the guide 10 remains unchanged during the interval when the leg 22 is held out of contact with the boss 10a because the guide 10 is then not subjected to the action of any forces which would tend to move it toward or away from the rail 6. The distance between the edge face 6a of the rail 6 and the pads 13, 14 corresponds exactly to the width of the film 5. This insures that the pads 13, 14 cannot interfere with movement of film 5 from the position of FIG. 3 to that of FIG. 5, i.e., with movement of the pressure plate 18 from retracted to operative position. Such movement of the pressure plate 18 would be impeded if the spring 17 were free to bias the guide 10 while the plate 18 dwells in the retracted position. The friction between the guide 10 on the one hand and the plate 1 and bearing member 8 on the other hand is sufficient to prevent unintentional displacement of the pads 13, 14.

As stated before, the levers 26, 29 assume the positions shown in FIG. 4 whenever the pressure plate 18 dwells in the operative position of FIG. 5. The arm 32 of the intermediate lever 29 then maintains the mask 36 away from registry with the window 2 while the arm 23 of the displacing lever 26 stresses the leg 21 to maintain the median portion 22a of the leg 22 in requisite engagement with the boss 10a. The sequence of the just described movements is such that the spring 17 begins to bias the guide 10 after the pressure plate 18 returns to the operative position of FIG. 5.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a cinematographic apparatus, a combination comprising a gate including first and second guide means defining a channel for motion picture film, one of said guide means being movable toward and away from the other guide means and each thereof being arranged to engage one marginal portion of the film in said channel; resilient means arranged to bias said one guide means toward said other guide means so that each of said guide means engages the respective marginal portion of the film in said channel, said resilient means comprising spring means movable to and from an operative position in which said spring means biases said one guide means, said spring means including a first and a second portion and said gate further comprising a support for said guide means and said spring means; and actuating means operable to terminate the bias of said resilient means upon said one guide means, said actuating means being movable between first and second positions in which said actuating means respectively maintains said spring means in and away from said operative position, said actuating means comprising a displacing member coupled to said first and second portions of said spring means and movable with reference to said support to thereby move one of said portions to and away from said operative position.

2. A combination as defined in claim 1, wherein said spring means comprises a hairpin spring having two legs constituting said first and second portions thereof and said displacing member is a lever which is pivotable with reference to said support.

3. A combination as defined in claim 2, wherein the length of said first portion is different from the length of said second portion.

4. A combination as defined in claim 3, wherein the length of said one portion exceeds the length of said other portion.

5. In a cinematographic apparatus, a combination comprising a gate including first and second guide means defining a channel for motion picture film, one of said guide means being movable toward and away from the other guide means and each thereof being arranged to engage one marginal portion of the film in said channel, said gate further comprising a support for said guide means, said support having window means in registry with the frames of film which is transported lengthwise in said channel; resilient means arranged to bias said one guide means toward said other guide means so that each of said guide means engages the respective marginal portion of the film in said channel; actuating means operable to terminate the bias of said resilient means upon said one guide means; and masking means arranged to move into registry with said window means in response to operation of said actuating means.

6. A combination as defined in claim 5, wherein said actuating means comprises a movable displacing member operatively connected with said resilient means, a movable input member and in intermediate member arranged to effect movement of said displacing member in response to movement of said input member, said masking means being provided on said intermediate member.

7. In a cinematographic apparatus, a combination comprising a gate including first and second guide means defining a channel for motion picture film, one of said guide means being movable toward and away from the other guide means and each thereof being arranged to engage one marginial portion of the film in said channel, said gate further including a support for said guide means; resilient means arranged to bias said one guide means toward said other guide means so that each of said guide means engages the respective marginal portion of the film in said channel, said one guide means being movable relative to said support with at least some friction so as to oppose changes in its position on termination of said bias; and actuating means operable to terminate the bias of said resilient means upon said one guide means.

References Cited
UNITED STATES PATENTS

| | | | |
|---|---|---|---|
| 1,404,773 | 1/1922 | Hunt | 352—224 X |
| 2,427,327 | 9/1947 | Nemeth | 352—224 |
| 3,129,633 | 4/1964 | Mees | 352—224 |

FOREIGN PATENTS

| | | | |
|---|---|---|---|
| 841,102 | 7/1960 | Great Britain | 352—221 |

LOUIS CAPOZI, Primary Examiner

J. W. ROSKOS, Assistant Examiner

U.S. CL. X.R.

352—80